United States Patent
Ding et al.

(10) Patent No.: US 12,531,546 B2
(45) Date of Patent: Jan. 20, 2026

(54) OSCILLATOR CONTROL SYSTEM

(71) Applicant: NXP B.V., Eindhoven (NL)

(72) Inventors: Pengfei Ding, Shanghai (CN); Chunlei Zhao, Shanghai (CN); Cheng Yu, Shanghai (CN)

(73) Assignee: NXP B.V., Eindhoven (NL)

( * ) Notice: Subject to any disclaimer, the term of this patent is extended or adjusted under 35 U.S.C. 154(b) by 180 days.

(21) Appl. No.: 18/348,871

(22) Filed: Jul. 7, 2023

(65) Prior Publication Data
US 2024/0022237 A1   Jan. 18, 2024

(30) Foreign Application Priority Data
Jul. 13, 2022  (CN) .......................... 202210819735.1

(51) Int. Cl.
*H03K 3/012* (2006.01)
*G06F 1/08* (2006.01)

(52) U.S. Cl.
CPC ............... *H03K 3/012* (2013.01); *G06F 1/08* (2013.01)

(58) Field of Classification Search
CPC .......... G06F 1/08; G06F 1/3237; G06F 1/324; H03K 3/012; H03K 3/014; H03K 3/015
See application file for complete search history.

(56) References Cited

U.S. PATENT DOCUMENTS

| | | | |
|---|---|---|---|
| 5,502,689 A * | 3/1996 | Peterson | G06F 1/3203 368/203 |
| 5,628,020 A * | 5/1997 | O'Brien | G06F 1/04 713/323 |
| 6,085,325 A | 7/2000 | Jackson et al. | |
| 7,203,855 B2 | 4/2007 | Chou | |
| 8,065,544 B2 | 11/2011 | Smit et al. | |
| 8,943,352 B1 | 1/2015 | Warneke | |
| 9,235,251 B2 | 1/2016 | Gargash et al. | |
| 2001/0007113 A1 | 7/2001 | Shay | |

* cited by examiner

*Primary Examiner* — Raymond N Phan (57) ABSTRACT

The disclosure relates to an oscillator control system with dynamic control for power saving. Example embodiments include an oscillator control system comprising: an oscillator configured to provide an oscillator clock signal (osc_clk) in response to receiving an oscillator enable signal (en_osc); a system clock signal generator configured to generate a system clock signal (sys_clk); a system controller connected to receive a system clock signal (sys_clk) from the clock signal generator; and an oscillator controller configured to provide the oscillator enable signal (en_osc) to the oscillator and receive the oscillator clock signal (osc_clk), to receive the system clock signal (sys_clk) from the clock signal generator and a system mode signal (sys_mode) from the system controller, and to receive a first change of state signal from an input of the oscillator control system, wherein the oscillator controller, on receiving the first change of state signal, is configured to transition the oscillator control system from a first mode in which the oscillator clock signal and system clock signal are enabled to a second mode in which the oscillator clock signal and system clock signal are disabled by disabling the system clock signal (clk_enable) after a first set time period from receiving the change of state signal and to disable the oscillator enable signal (en_osc) after a second set time period following the first set time period.

18 Claims, 7 Drawing Sheets

Fig. 7

OSCILLATOR CONTROL SYSTEM

CROSS-REFERENCE TO RELATED APPLICATIONS

This application claims the priority under 35 U.S.C. § 119 of China Patent application no. 202210819735.1, filed on 13 Jul. 2022, the contents of which are incorporated by reference herein.

FIELD

The disclosure relates to an oscillator control system with dynamic control for power saving.

BACKGROUND

In conventional embedded oscillator systems, the system clock is a main source of power consumption even when in a low power mode, since a low frequency clock source is typically used to enable the system to be woken up from low power mode to a high power mode to maintain synchronous operation. A general problem therefore is how to reduce power consumption in a low power mode while maintaining correct operation upon wake-up.

SUMMARY

According to a first aspect there is provided an oscillator control system comprising:
 an oscillator configured to provide an oscillator clock signal in response to receiving an oscillator enable signal;
 a system clock signal generator configured to generate a system clock signal;
 a system controller connected to receive a system clock signal from the clock signal generator; and
 an oscillator controller configured to provide the oscillator enable signal to the oscillator and receive the oscillator clock signal, to receive the system clock signal from the clock signal generator and a system mode signal from the system controller, and to receive a first change of state signal from an input of the oscillator control system,
 wherein the oscillator controller, on receiving the first change of state signal, is configured to transition the oscillator control system from a first mode in which the oscillator clock signal and system clock signal are enabled to a second mode in which the oscillator clock signal and system clock signal are disabled by disabling the system clock signal after a first set time period from receiving the change of state signal and to disable the oscillator enable signal after a second set time period following the first set time period.

Disabling the oscillator after the second set time period following the first set time period enables the oscillator control system to be placed in the second, low power, mode in a way that allows processes requiring the system clock signal to have time to close, following which the oscillator clock signal can be disabled. This enables the system to be woken up from the low power mode while maintaining synchronous operation without the need to maintain a low frequency clock source.

The oscillator controller may comprise a first counter to define the first set time period by a first number of oscillator clock cycles and a second counter to define the second set time period by a second number of oscillator clock cycles. The first number may be ten or more oscillator clock cycles. The second number may be two or more oscillator clock cycles.

The oscillator controller may be configured to maintain the first mode if, during the first set time period, a second change of state signal is received. This reduces the number of unnecessary switching operations, thereby reducing the system's response time to changes and commands.

The oscillator controller may be configured, on receiving a third change of state signal when in the second mode, to enable the oscillator to start the oscillator clock signal. The oscillator controller may be configured, after a third time period following enabling the oscillator enable signal, to provide a signal to the system clock signal generator to start the system clock signal to then enter the first mode. The third time period allows time for the oscillator clock signal to stabilise before the system clock is started, enabling the system to switch from the second to the first mode synchronously. The oscillator controller may comprise a third counter configured to define the third set time period by a third number of oscillator clock cycles.

According to a second aspect there is provided a method of operating an oscillator control system comprising an oscillator, a system clock signal generator, a system controller and an oscillator controller, the method comprising:
 the oscillator controller receiving a first change of state signal from a first input of the oscillator control system and transitioning the oscillator control system from a first mode in which the oscillator clock signal and system clock signal are enabled to a second mode in which the oscillator clock signal and system clock signal are disabled by disabling the system clock signal generator after a first set time period from receiving the change of state signal and disabling the oscillator after a second set time period following the first set time period.

In the first mode the oscillator may provide the oscillator clock signal to the oscillator controller in response to receiving an oscillator enable signal from the oscillator controller.

In the first mode the system controller may receive the system clock signal from the clock signal generator.

The oscillator controller may comprise a first counter to define the first set time period by a first number of oscillator clock cycles and a second counter to define the second set time period by a second number of oscillator clock cycles. The first number may be ten or more oscillator clock cycles. The second number may be two or more oscillator clock cycles.

The oscillator controller may maintain the first mode if, during the first set time period, a second change of state signal is received.

The oscillator controller may, on receiving a third change of state signal when in the second mode, enable the oscillator to start the oscillator clock signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
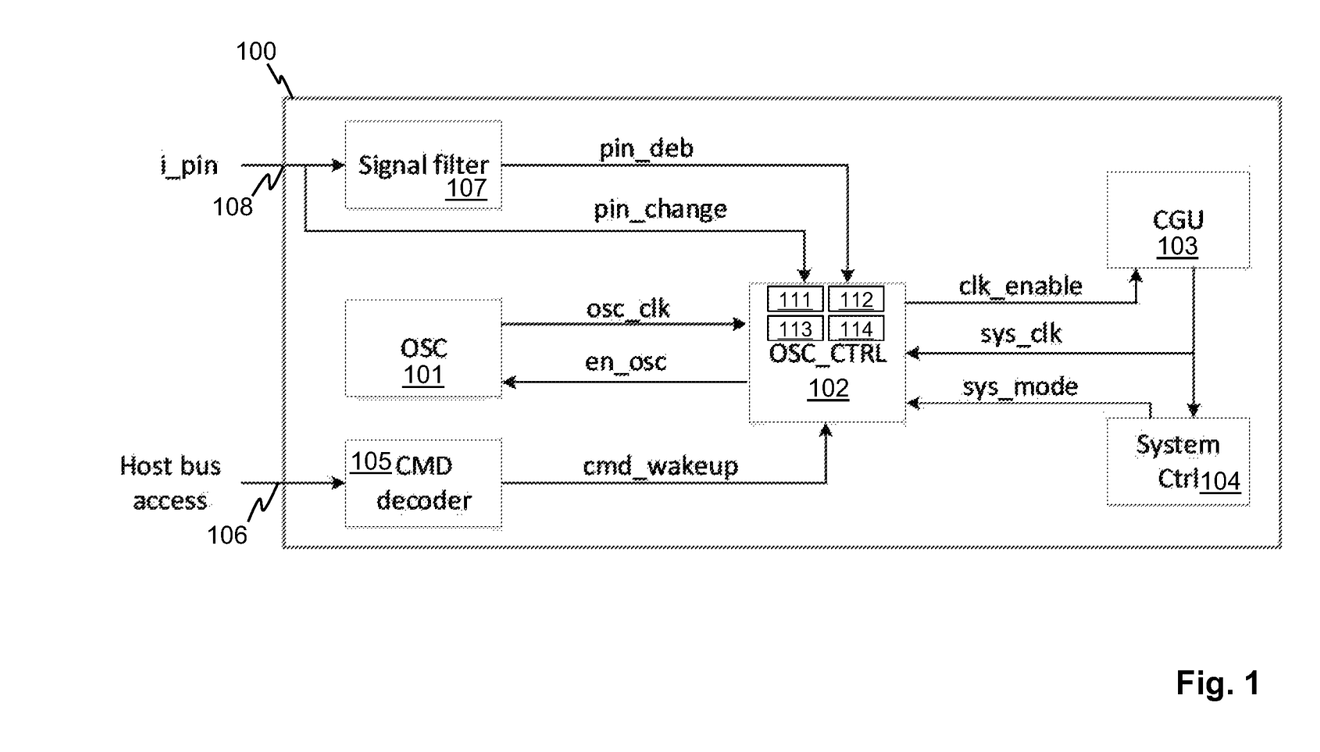
FIG. 1 is a schematic diagram of an example oscillator control system.

FIG. 1 illustrates an example oscillator control system 100. The system 100 comprises an oscillator 101, an oscillator controller 102, a clock signal generator (or clock generator unit CGU) 103 and a system controller 104. The oscillator controller 102 provides an oscillator enable signal en_osc to the oscillator 101 and receives an oscillator clock signal osc_clk from the oscillator 101. The system controller 104 provides a system mode signal sys_mode to the oscillator controller 102 to control the mode of operation of the oscillator controller 102. The clock signal generator 103 receives a clock enable signal clk_enable from the oscillator controller 102 and provides a system clock signal sys_clk to the oscillator controller 102 and the system controller 104.

A host access command decoder 105 is configured to receive a command from a host bus access input 106 and provide a wake-up signal cmd_wakeup to the oscillator controller 102 in response to a corresponding received command. The host access command decoder 105 operates to translate a command received from the host bus access input 106, which may for example be in a format according to the I2C communication protocol, and provides the wake-up signal cmd_wakeup according to the received command.

A pin input 108 provides a pin input signal pin_change to the oscillator controller 102. A signal filter 107 filters the pin input signal and provides a pin debounce signal pin_deb to the oscillator controller 102, the pin debounce signal changing if the pin input signal changes and remains in a changed state for a set period of time. The pin debounce signal pin_deb is used by the oscillator controller 102 to shut down the oscillator 101 using the en_osc signal.

The system controller 104 is configured to control operation of the system 100, including modes of operation such as a low power shutdown mode in which all clock signals are disabled. The oscillator controller 102 is configured to control operation of the oscillator 101, i.e. to turn the oscillator 101 on and off in response to input signals from the system controller 104, command decoder 105 and pin input 108. The oscillator controller 102 is configured to determine a priority of wake-up and shutdown operations to avoid unnecessary shutdowns.

Figure 2:
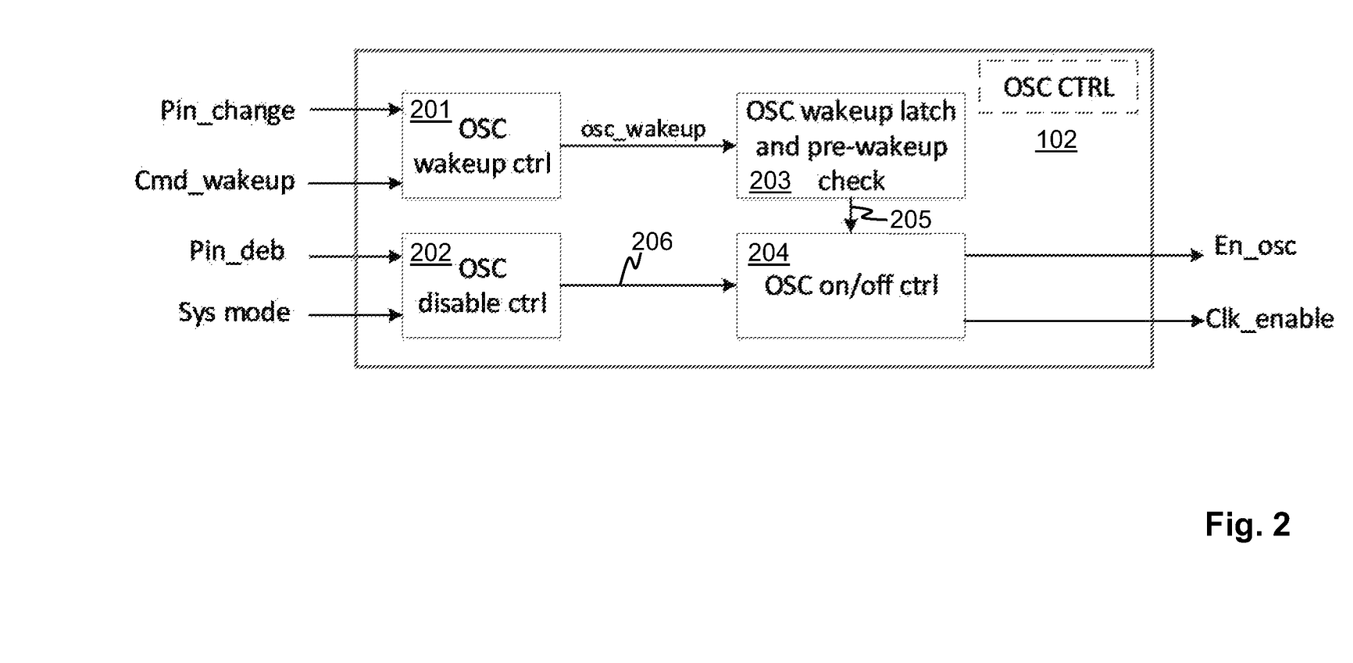
FIG. 2 is a schematic diagram of an example oscillator controller of the system of FIG. 1.

FIG. 2 illustrates a more detailed schematic diagram of the oscillator controller 102. The pin input signal pin_change from the pin input 108 and the wake-up signal cmd_wakeup from the command decoder 105 are provided to an oscillator wake-up control module 201, which provides an oscillator wake-up signal osc_wakeup to an oscillator latch module 203. The oscillator latch module 203 is configured to perform a pre-wakeup check and provide a first oscillator control signal 205 to an oscillator enable module 204, which provides the oscillator enable signal en_osc to the oscillator 101 and the clock enable signal clk_enable to the clock signal generator 103. The pin debounce signal pin_deb from the input signal filter 107 and the system mode signal sys_mode from the system controller 104 are provided to an oscillator disable control module 202, which provides a second oscillator control signal 206 to the oscillator enable module 204.

The pin_change and cmd_wakeup signals are used to perform a wake-up operation, while the pin_deb and sys_mode signals are used to perform a shutdown operation. The en_osc signal controls operation of the oscillator 101 directly, i.e. when en_osc is enabled the oscillator 101 is on and when en_osc is disabled the oscillator 101 is off. The clk_enable signal controls the system clock generated by the clock generator 103.

Figure 3:
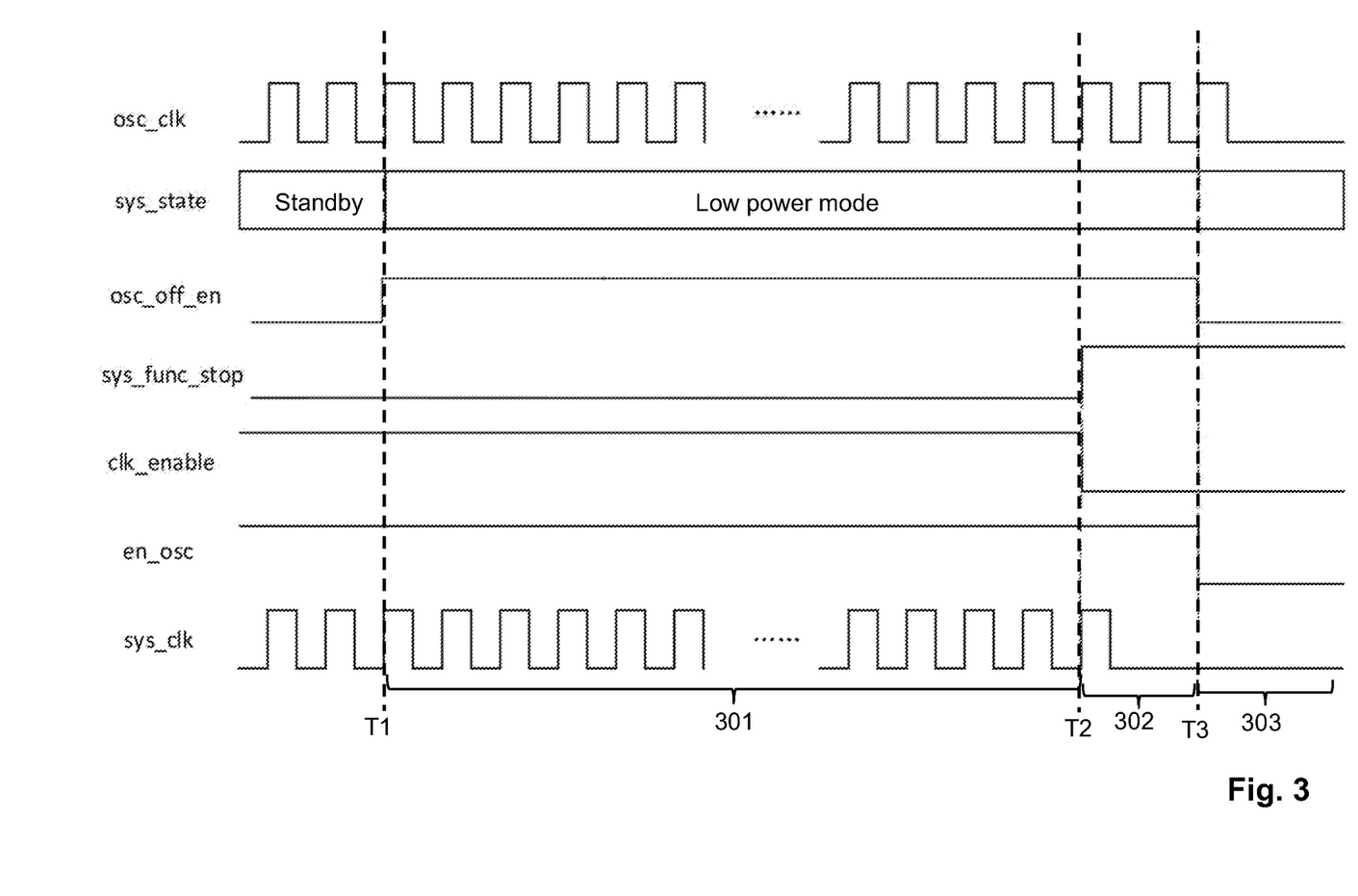
FIG. 3 is a schematic timing diagram illustrating various signals in the oscillator control system during a shut down sequence.

FIG. 3 illustrates a timing diagram during a shutdown sequence for the oscillator control system 100, showing the oscillator clock signal osc_clk, system state sys_state, oscillator off enable signal osc_off_en, system function stop signal sys_func_stop, clock enable signal clk_enable, oscillator enable signal en_osc and system clock signal sys_clk. The oscillator off enable signal osc_off_en is provided by the oscillator enable module 204 to the oscillator 101. The system function stop signal sys_func_stop is provided by the system controller 104 to the oscillator controller 102.

Initially the oscillator control system is in a first, or standby, mode, with the clock enable signal clk_enable and oscillator enable signal en_osc high, the oscillator and system clock signals osc_clk, sys_clk operational, the oscillator off enable signal osc_off_en low and the system function stop signal sys_func_stop low. At time T1 the oscillator controller receives a first change of state signal, which triggers osc_off_en to change, causing the system to begin transitioning to a second, low power, mode by starting a clock off sequence defining a first time period 301 for system processes to stop. At the end of this first time period 301, at time T2 the sys_func_stop signal goes high, triggered by an internal counter 111 (FIG. 1) that defines the time period 301, indicating that the oscillator can be shut down. At the same time the clk_enable signal goes low, resulting in the system clock being disabled. In a second time period 302, the system clock signal sys_clk stops, followed by at time T3 the osc_off_en and en_osc signals going low, which disables the oscillator clock signal osc_clk. The system is then in the second, low power, mode with no clock signals active.

The above sequence of operations ensures that no system processes are running when the system clock is disabled and that the oscillator clock is only disabled once the system clock is disabled. The length of the first and second time periods 301, 302 are selected according to the time taken for all system processes to stop and for the system clock to stop. In the example in FIG. 3, the second time period 302 is two clock cycles of the oscillator clock signal osc_clk, which ensures that the system clock signal is stopped before the oscillator is stopped. In a general aspect therefore, the second time period 302 is two or more clock cycles of the oscillator clock signal osc_clk. The first time period 301 is a plurality of cycles of the oscillator clock, which in the example shown is at least 10 cycles. The first and second time periods may be set by respective first and second counters 111, 112 in the oscillator controller 102.

Figure 4:
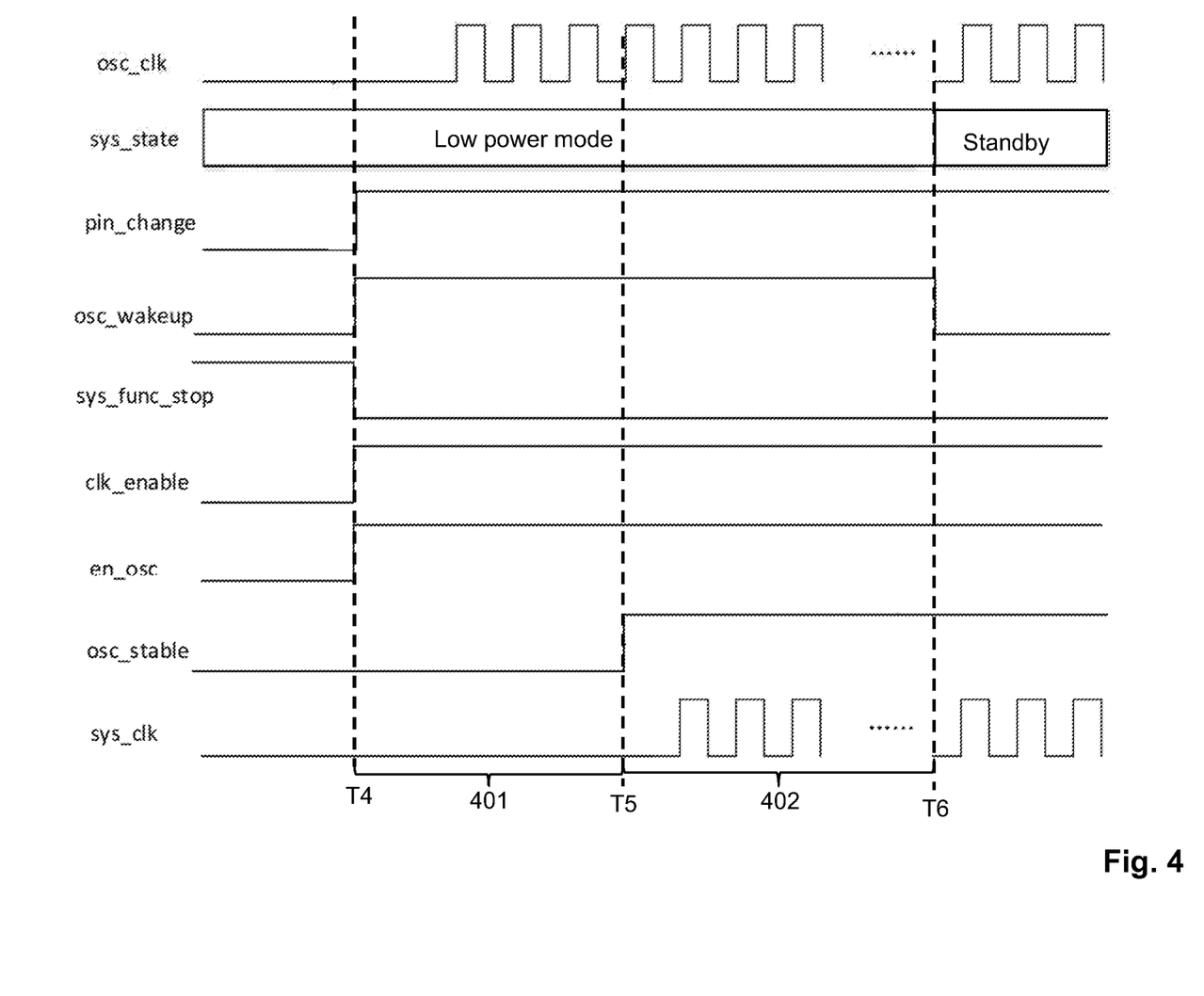
FIG. 4 is schematic timing diagram illustrating various signals in the oscillator control system during a wake-up sequence.

FIG. 4 illustrates another sequence of operations in which the oscillator control system 100 transitions from the second, low power, mode in which the oscillator clock and system clock are off to the first, standby, mode in which both the oscillator clock and system clock are on. At a time T4, the oscillator controller 102 receives a change of state signal in the form of the pin_change signal going from low to high, which causes the oscillator wake-up controller 201 to enable the osc_wakeup signal and the oscillator on/off controller 204 to enable the clk_enable and en_osc signals. The sys_func_stop signal goes from high to low. At a time T5, the osc_stable signal goes high, indicating that the oscillator clock signal is stable and the system clock can be started. The time period 401 between time T4 and time T5 may be set by a counter 113 in the oscillator controller 102 that is set to count a number of clock cycles after which the oscillator is considered to be stable. The clock generator 103 then starts the system clock. Once the system clock signal sys_clk is started, after a further time period 402, which may be set by a further counter 114, the oscillator wake-up signal osc_wakeup goes low at time T6 and the oscillator control system 100 exits from the low power mode and enters the standby mode with the oscillator clock and system clock signals osc_clk, sys_clk operational.

Figure 5:
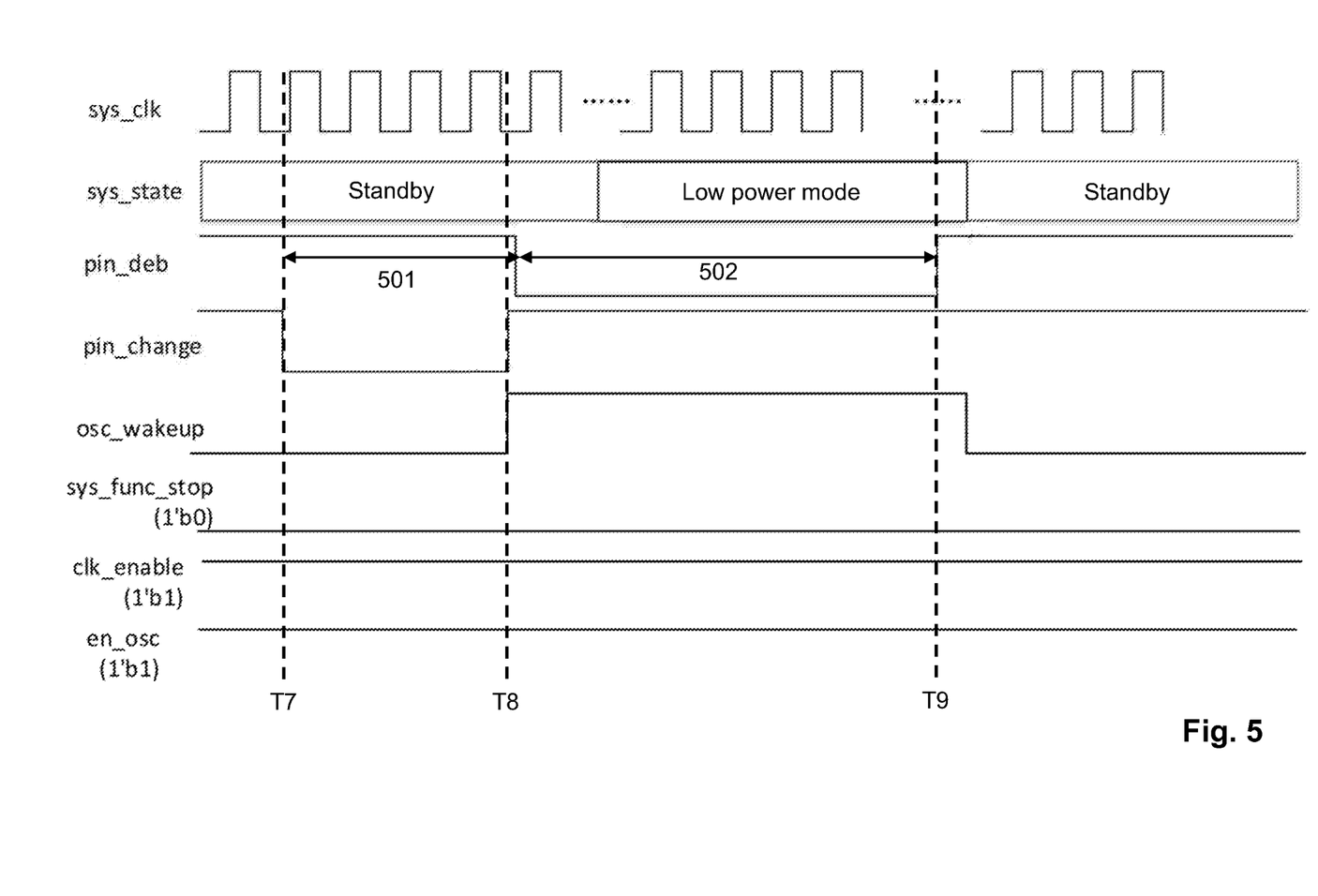
FIG. 5 is a schematic timing diagram illustrating various signals in the oscillator control system during a monitoring and predictive wake-up sequence.

FIG. 5 illustrates a sequence of operations in which the oscillator control system 100 carries out a monitoring and predictive wake-up sequence. A change of state signal is received at time T7 by the pin_change signal changing, which triggers the oscillator wake-up signal osc_wakeup to change. The pin_deb signal changes in response to the pin_change signal after a first debounce time 501, which may for example be around 80 µs. The oscillator controller 100 then begins the shutdown process by waiting for a set time period (i.e. the time period 301 of FIG. 3, described above) before shutting down the system clock sys_clk. Before the end of this time period, however, the oscillator controller receives a further change of state signal in the form of the pin_deb signal changing again as a result of the pin_change signal going high at time T8, causing the pin_deb signal to change after a second debounce time 502 at time T9, the second debounce time 502 being for example around 100 µs. This triggers the oscillator controller to maintain the oscillator control system 100 in the standby mode and the system clock signal and oscillator clock signal are maintained.

Figure 6:
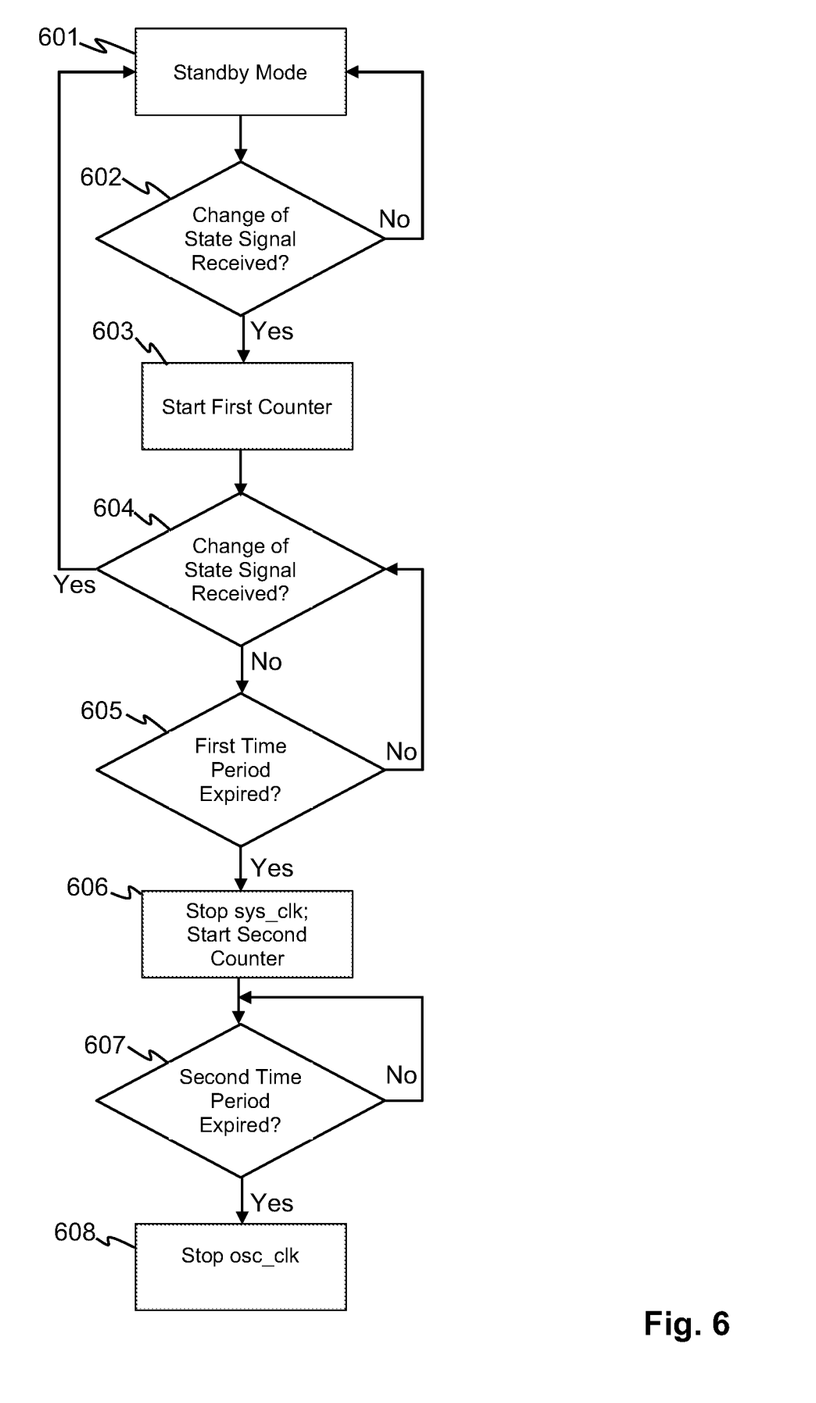
FIG. 6 is a schematic flow diagram illustrating an example method of operating an oscillator control system starting from a standby mode.

FIG. 6 is a schematic flow diagram illustrating a series of operations as set out above in relation to FIGS. 3 and 5. In a first step 601 the system is in a first standby mode, with both the oscillator and system clock signals operational. The system remains in standby mode until a change of state signal is received (step 602), at which point a first counter 111 is started (step 603). If a further change of state signal is received (step 604) while the first counter 111 is running and before a first time period expires (step 605), the system reverts to the standby mode (step 601). Otherwise, once the first time period set by the first counter 111 expires (step 605), the system clock is stopped and a second counter 112 is started (step 606). Once a second time period defined by the second counter 112 expires (step 607) the oscillator clock is stopped (step 608) and the system is in the second low power mode.

Figure 7:
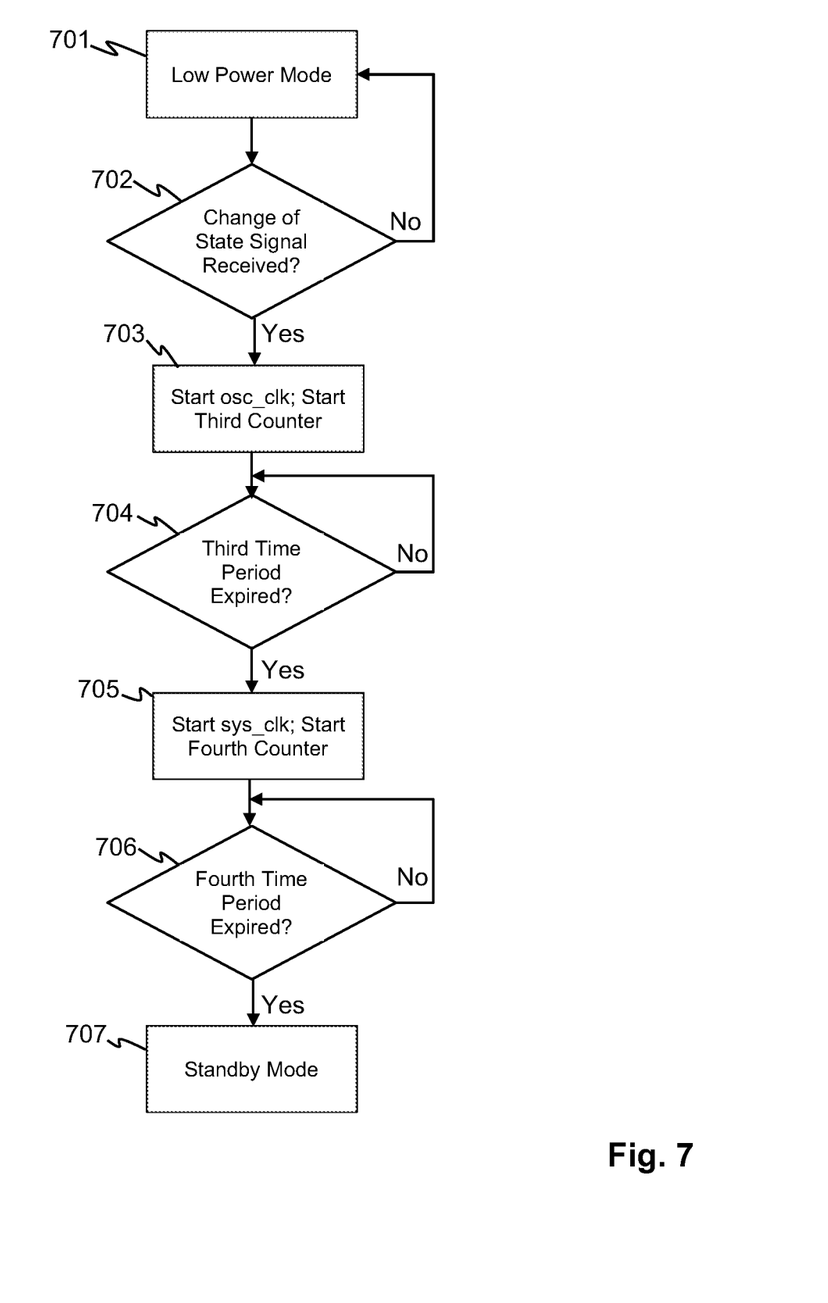
FIG. 7 is a schematic flow diagram illustrating an example method of operating an oscillator control system starting from a low power mode.

FIG. 7 is a further flow diagram illustrating a series of operations as set out above in relation to FIG. 4. In a first step 701 the system is in a second low power mode. If a change of state signal is received (step 702), the oscillator clock is started and a third counter 113 is started (step 703), otherwise the system remains in the low power mode. Once the third time period expires (step 704), indicating that the oscillator clock signal is stable, the system clock is started (step 705) and a fourth counter 114 is started. Once the fourth time period expires (step 706), the system is in the first standby mode (step 707).

An advantage of the oscillator control system as described herein is that all clock signals can be shut down to a low power state to save on power and an asynchronous wake-up is enabled from the low power state. By delaying shutdown of the system clock following a change of state signal being received, unnecessary shutdowns can be avoided.

From reading the present disclosure, other variations and modifications will be apparent to the skilled person. Such variations and modifications may involve equivalent and other features which are already known in the art of oscillator control systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:
1. An oscillator control system comprising:
an input configured to receive change of state signals;
an oscillator configured to provide an oscillator clock signal (osc_clk) in response to receiving an oscillator enable signal (en_osc);
a system clock signal generator configured to generate a system clock signal (sys_clk);
a system controller connected to receive the system clock signal (sys_clk) from the clock signal generator; and
an oscillator controller configured
to provide the oscillator enable signal (en_osc) to the oscillator and
receive the oscillator clock signal (osc_clk),
to receive the system clock signal (sys_clk) from the clock signal generator and a system mode signal (sys_mode) from the system controller, and
to receive a first change of state signal received by the input of the oscillator control system,
wherein the oscillator controller, on receiving the first change of state signal, is configured to transition the oscillator control system from a first mode in which the oscillator clock signal (osc_clk) and the system clock signal (sys_clk) are enabled
to a second mode in which the oscillator clock signal (osc_clk) and the system clock signal (sys_clk) are disabled
by disabling a clock enable signal (clk_enable) after a first set time period from receiving the first change of state signal and
to disable the oscillator enable signal (en_osc) after a second set time period following the first set time period;
wherein the oscillator controller, on receiving a second change of state signal received by the input, is configured to transition the oscillator control system from the second mode in which the oscillator clock signal (osc_clk) and the system clock signal (sys_clk) are disabled to the first mode in which the oscillator clock signal (osc_clk) and the system clock signal (sys_clk) are enabled.

2. The oscillator control system of claim 1, wherein the oscillator controller comprises a first counter to define the first set time period by a first number of oscillator clock cycles and a second counter to define the second set time period by a second number of oscillator clock cycles.

3. The oscillator control system of claim 1, wherein the oscillator controller is configured to maintain the first mode if, during the first set time period, a second change of state signal on the input is received.

4. The oscillator control system of claim 1, wherein the oscillator controller is configured, after a third time period following enabling the oscillator enable signal (en_osc), to provide a signal (osc_stable) to the system clock signal generator to start the system clock signal (sys_clk) and enter the first mode.

5. The oscillator control system of claim 1:
wherein the input is a single dedicated pin.

6. The oscillator control system of claim 1:
wherein the first change of state signal is a binary signal having a first polarity; and
wherein the second change of state signal is a binary signal having a second polarity.

7. The oscillator control system of claim 1:
wherein the input is configured to receive only change of state signals.

8. The oscillator control system of claim 2, wherein the first number is ten or more oscillator clock cycles.

9. The oscillator control system of claim 2, wherein the second number is two or more oscillator clock cycles.

10. The oscillator control system of claim 4, wherein the oscillator controller comprises a third counter configured to define the third set time period by a third number of oscillator clock cycles.

11. The oscillator control system of claim 5:
wherein both the first change of state signal and the second change of state signal are received over the single dedicated pin.

12. A method of operating an oscillator control system comprising an oscillator, a system clock signal generator, a system controller and an oscillator controller, the method comprising:
the oscillator controller
receiving a first change of state signal from an input of the oscillator control system and
transitioning the oscillator control system from a first mode in which the oscillator clock signal (osc_clk) and system clock signal (sys_clk) are enabled to a second mode in which the oscillator clock signal (osc_clk) and system clock signal (sys_clk) are disabled by disabling the system clock signal generator after a first set time period from receiving the first change of state signal and disabling the oscillator after a second set time period following the first set time period; and
receiving a second change of state signal from the input of the oscillator control system and
transitioning the oscillator control system from the second mode in which the oscillator clock signal (osc_clk) and the system clock signal (sys_clk) are disabled to the first mode in which the oscillator clock signal (osc_clk) and the system clock signal (sys_clk) are enabled.

13. The method of claim 12, wherein in the first mode the oscillator provides the oscillator clock signal (osc_clk) to the oscillator controller in response to receiving an oscillator enable signal (en_osc) from the oscillator controller.

14. The method of claim 12, wherein in the first mode the system controller receives the system clock signal (sys_clk) from the clock signal generator.

15. The method of claim 12, wherein the oscillator controller comprises a first counter to define the first set time period by a first number of oscillator clock cycles and a second counter to define the second set time period by a second number of oscillator clock cycles.

16. The method of claim 12, wherein the oscillator controller maintains the first mode if, during the first set time period, a second change of state signal is received.

17. The method of claim 15, wherein the first number is ten or more oscillator clock cycles and/or wherein the second number is two or more oscillator clock cycles.

18. The method of claim 12, wherein the oscillator controller, on receiving a third change of state signal when in the second mode, enables the oscillator to start the oscillator clock signal (osc_clk).

* * * * *